Figure 1:
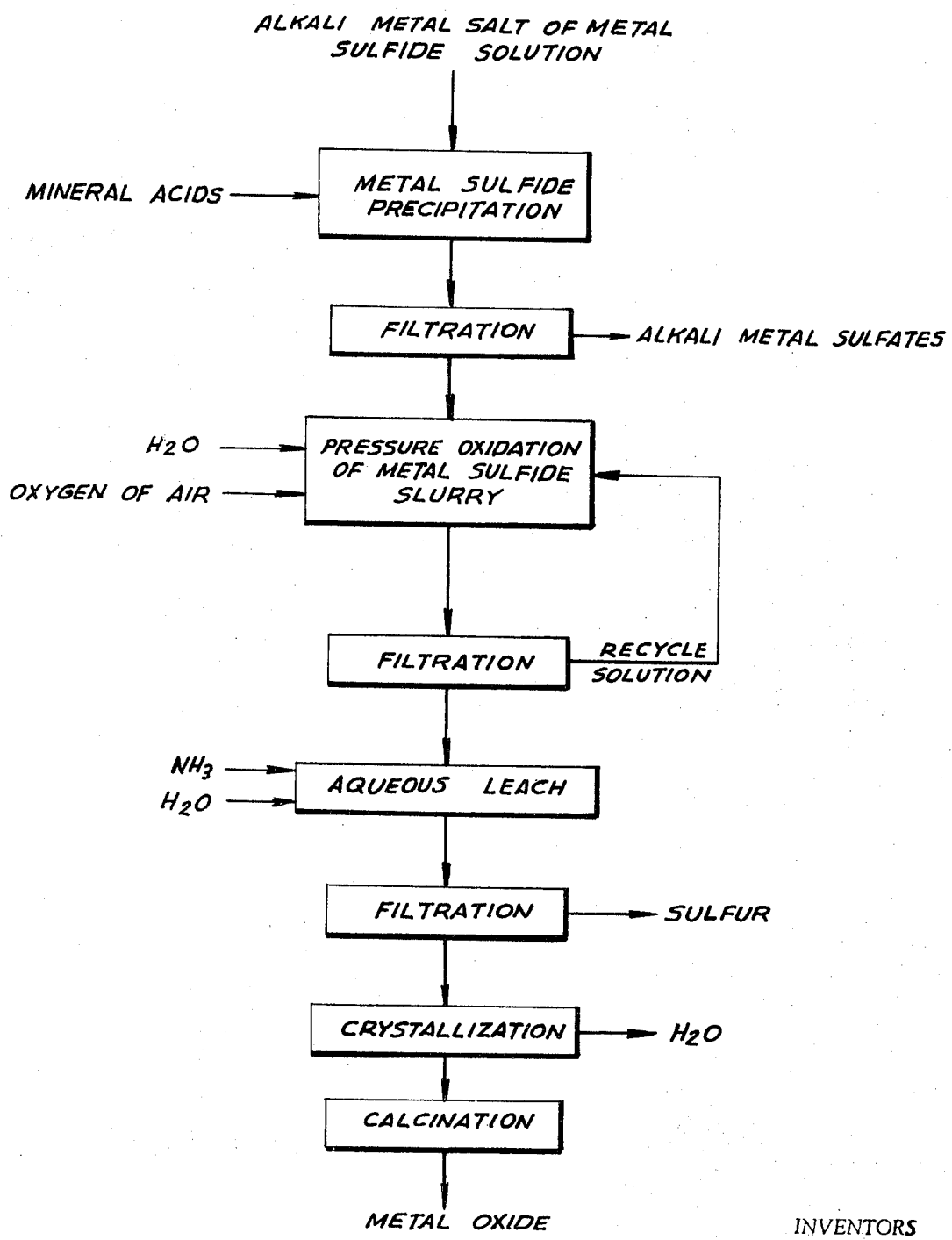

United States Patent
Drobnick et al.

[15] 3,658,465
[45] Apr. 25, 1972

[54] PRESSURE OXIDATION PROCESS

[72] Inventors: James L. Drobnick, Lakewood; Albert E. Erhard, Denver; Ellsworth W. Daugherty, Golden, all of Colo.

[73] Assignee: Molybdenum Corporation of America, New York, N.Y.

[22] Filed: Sept. 11, 1969

[21] Appl. No.: 857,181

[52] U.S. Cl. .............................. 23/15 W, 23/140, 23/144, 23/224, 23/18, 23/20
[51] Int. Cl. ........................................... C22b 59/00
[58] Field of Search .............. 23/15, 15 W, 18, 19, 224, 140, 23/144; 75/121

[56] References Cited

UNITED STATES PATENTS

| | | | |
|---|---|---|---|
| 1,118,150 | 11/1914 | Robertson | 23/15 W |
| 2,339,888 | 1/1944 | Smith | 23/15 W |
| 2,556,255 | 6/1951 | Carosella | 23/15 W |
| 2,892,741 | 6/1959 | Spengler et al | 23/15 W |
| 3,256,058 | 6/1966 | Burwell | 23/15 W |

OTHER PUBLICATIONS

Dresher et al., " Journal of Metals," June 1956, pp. 794– 800
Usataya, " Chemical Abstracts," Vol. 47, 1953, p. 5313

Primary Examiner—Herbert T. Carter
Attorney—Morgan, Finnegan, Durham and Pine

[57] ABSTRACT

The present invention is concerned with a novel process for the oxidation of metal-sulfur-containing compositions. The invention is particularly concerned with the oxidation of refractory metal-sulfur-containing compositions.

10 Claims, 2 Drawing Figures

PRESSURE OXIDATION PROCESS

In accordance with the process of this invention, a substantial amount of elemental sulfur is obtained upon oxidation of a metal-sulfur-containing composition in contrast to the sulfur oxide that normally is obtained with the heretofore used processes for the production of metal oxides from compositions containing metal sulfides.

The process of this invention comprises subjecting an aqueous system containing a thio derivative of a metal (metal sulfide) under suitable conditions of elevated temperature and pressure in the presence of an oxygen-containing gas so that there results oxidation of the metal sulfide and with the production of elemental sulfur as a by-product. By such process, oxidation of the sulfur-containing material is effectuated without significant $SO_2$ production.

The aqueous system treated in accordance with the present invention may be in the form of an aqueous slurry of a water-insoluble thio metal composition (e.g., water-insoluble molybdenum sulfide) or in the form of aqueous solutions of water soluble salts of thio metal compositions (e.g., alkali metal salts of molybdenum sulfide).

Prior to this invention there were known processes for separating metals, particularly refractory metals, from other metals in concentrates containing said refractory metals and other metals which comprise mixing an alkali metal sulfur compound with the concentrate at a molar ratio of alkali metal sulfur compound to refractory metal of at least 1.5:1, heating the mixture to a fusion temperature of above 700° to 1,600° C., in a non-oxidizing atmosphere and/or with a reducing agent to obtain "a water soluble alkali metal thio-refractory metal sulfur compound reaction product," (which may be referred to as an alkali metal salt of a metal sulfide), contacting said product with an aqueous leach solution and selectively solubilizing said alkali metal thio-refractory metal compound, and separating said leach solution from a insoluble concentrate residue. In the case of certain alkali metal, thio-refractory metal compounds, such, for example, as molybdenum or vanadium-containing, a mineral acid may be added to the leach solution to a controlled pH to selectively precipitate the refractory metal as a "water-insoluble metal sulfide."

In (e.g. above-mentioned known processes, recovered sulfur-containing compounds are ultimately converted to oxide forms by processes including the utilization of a roasting technique by heating a metal-sulfur-containing composition at elevated temperature e.g., 260° to 600° C.) in the presence of air. A serious drawback of such a roasting procedure is that one of the by-products of such roasting is $SO_2$ which is of greater concern with respect to air pollution.

Broadly speaking, the present invention relates to a process for the pressure oxidation of a metal-sulfur-containing composition which comprises subjecting an aqueous system containing a thio derivative of a metal to elevated temperature and elevated pressure in the presence of an oxygen-containing gas, to effect oxidation of the metal-sulfur-containing composition and produce elemental sulfur, said aqueous system being selected from the group consisting of aqueous solutions of water-soluble salts of thio metal compositions and aqueous slurries of water-insoluble thio metal compositions.

The present invention provides a process which avoids the production of a substantial amount of $SO_2$ in the manufacture of metal oxides from metal sulfur-containing compounds. Instead, by the process of the present invention, a substantial amount of elemental sulfur is produced in the oxidation of the metal sulfur-containing compound.

Preferably, the pressure-oxidation process of this invention is employed as an intermediate step in an overall process for the recovery of metal oxides from a metal concentrate, the overall process comprising treating the metal concentrate to obtain a metal-sulfur-containing composition selected from the group consisting of water-insoluble metal sulfides and water-soluble alkali metal thio metal compounds, subjecting an aqueous system containing said metal-sulfur containing composition to elevated temperature and elevated pressure in the presence of an oxygen-containing gas to effect oxidation of the metal-sulfur containing composition and produce elemental sulfur and subsequently treating the product resulting from said oxidation in such a manner to obtain separated metal oxides.

In order to explain the invention more fully, reference will now be made to the flow sheets shown in FIGS. 1 and 2 which include the novel pressure-oxidation process of this invention.

The flow sheet shown in FIG. 1 illustrates the pressure oxidation of metal sulfide slurries. As shown in FIG. 1, to an alkali metal sulfide solution is added a mineral acid to selectively precipitate a water-insoluble metal sulfide composition. The resulting mixture is subjected to filtration to obtain a filtrate containing alkali metal salts (e.g. alkali metal sulfates) and a water-insoluble metal sulfide precipitate residue.

An aqueous slurry of the metal sulfide precipitate is then formed by the addition of water to the water-insoluble metal sulfide and is put into a suitable pressure reactor and pressure oxidized (oxygen on air) at suitable elevated temperature (e.g., 160° C.) and pressure (e.g., 170 p.s.i.g.).

The resulting slurry contains metal oxides and elemental sulfur as the predominant sulfur component. Advantageously, no significant amounts of $SO_2$ are produced in the above-mentioned pressure oxidation step.

The above-mentioned slurry containing the desired metal oxides may then be subjected to suitable purification techniques to obtain purified metal oxides. For example, the slurry may be filtered with recycle of the filtrate to the pressure reactor and subjecting the residue to an aqueous ammonia solution to dissolve the metal oxide components. When the resulting mixture is subjected to filtration, a solid sulfur residue is obtained along with a filtrate containing soluble metal oxide components. The metal filtrate is then subjected to evaporation resulting in crystallization of the metal oxide components. The crystallized metal oxide components are then dried by calcination resulting in the production of dried metal oxides.

By the overall process shown in FIG. 1, it is seen that pure metal oxides may be obtained from metal sulfides with sulfur being produced in substantial amounts as a by-product instead of $SO_2$ as is normally produced by the known conversion process for obtaining metal oxides from metal sulfur-containing compositions.

Figure 2:
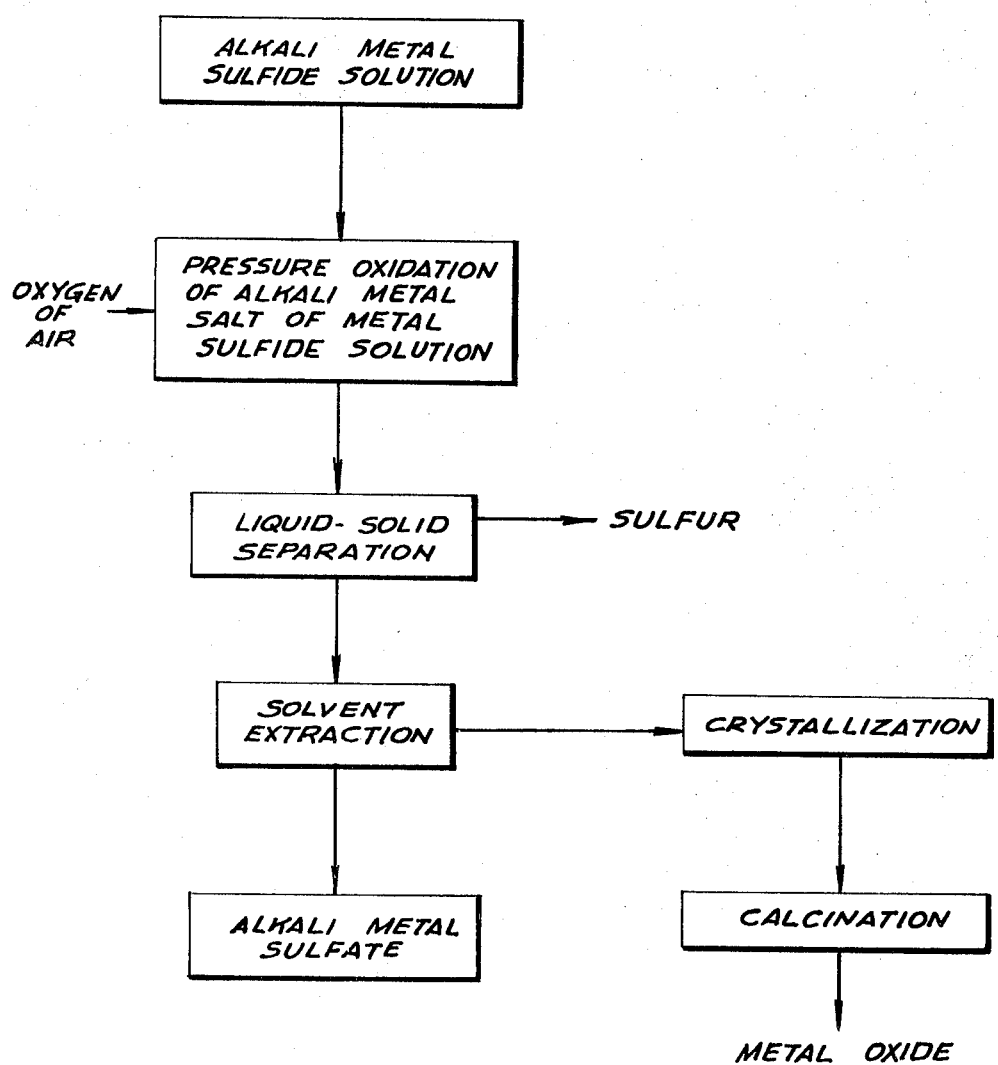

The flow sheet shown in FIG. 2 illustrates a process for obtaining metal oxides from aqueous solutions of alkali metal salts of metal sulfides which includes a step for the pressure oxidation of alkali metal salt of metal sulfide. As shown in FIG. 2, an aqueous solution of an alkali metal salt of a metal sulfide is charged to a pressure reactor and oxidized in the presence of air or oxygen at elevated temperature and elevated pressure. The resulting mixture is then subjected to a separation step (e. g., filtration) to give a solid sulfur fraction and a liquid oxidized solution.

The metal component in the oxidized solution is in an oxidized form (e.g., Mo converted to $Mo^{+6}$ from $Mo^{+4}$).

The oxidized solution is then subjected to a suitable solvent extraction step to extract the metal component from the oxidized solution after which the solvent containing the metal component is stripped of the metal component with an aqueous ammonia solution and evaporated to crystallize the metal component. The crystallized metal component is then subjected to calcination resulting in the production of the desired metal oxide.

As in the case of the process illustrated in FIG. 1, the process of FIG. 2 permits one to produce metal oxides from alkali metal salts of metal sulfide solutions without the production of significant amounts of $SO_2$.

In carrying out the pressure oxidation process of the present invention, the conditions of pressure, temperature and time are correlated such that effective oxidation of the metal sulfide (i.e., water-soluble alkali metal salt of metal sulfide or water-insoluble metal sulfide) is effectuated with the production of elemental sulfur without causing significant sulfur oxidation.

If too low a pressure is used, ineffective oxidation of the metal sulfide occurs with resultant poor conversion of the sulfide to an oxidized form. The maximum pressure is of course governed by practical economics and limitations of equipment that is used. It has been found that good results are obtained when the pressure is generally in a range of 50 to 600 p.s.i.a., and preferably 100 to 200 p.s.i.a.

In like manner, if too low a temperature is employed, poor conversion of the metal sulfide to an oxidized form is obtained while the upper temperature is governed by practical economics and limitations of the equipment that is used. In general, good results are obtained when the temperature is generally in the range of 60° to 200° C., and preferably 105° to 180° C.

Of course, the time required for effecting the desired oxidation varies depending upon the pressure and temperature conditions. With higher temperature and/or pressure, a lesser period of time is required. In general, satisfactory yields are obtained when the time period is in the range of 15 minutes to 12 hours, and preferably 1 to 4 hours.

The oxygen required for oxidation may be provided by pure oxygen or air. In order to obtain optimum yields, the amount of oxygen or air that is added is an amount that is sufficient to provide oxygen up to the substantially stochimetric amount for effecting complete oxidation of the metal sulfide. If the amount of oxygen that is provided is above the stoichiometric amount, oxidation of the elemental sulfur by product results which of course is undesirable, while if the amount of oxygen is less than the stoichiometric amount, the extent of oxidation of the sulfide decreases as the amount of available oxygen decreases.

SUITABLE MATERIALS FOR PRESSURE OXIDATION

The following discussion gives details with respect to materials that may be oxidized in accordance with the process of this invention.

Examples of suitable metal sulfur compounds that may be pressure oxidized in accordance with the process of this invention are molybdenum, vanadium, tungsten, tin and antimony-containing compounds, all of the aforementioned metals being of the refractory metal type with the exception of antimony.

The pressure oxidation process of the present invention is advantageously employed as an intermediate step in an overall process whereby metal oxides are obtained from metal concentrates.

In such overall process, metal sulfides, either in the form of alkali metal salts of metal sulfides or in the form of water-insoluble metal sulfides are first obtained from metal concentrates and then the metal sulfide that is obtained, in the form of an aqueous slurry or aqueous solution, is subjected to pressure oxidation in the manner described herein. With respect to the first mentioned step, as indicated earlier, metal sulfides may be obtained from appropriate concentrates by mixing an alkali metal sulfur compound with the concentrate at a molar ratio of alkali metal sulfur compound to metal of at least 1.5:1, heating the mixture to a fusion temperature of above 700° to 1,600° C., in a non-oxidizing atmosphere and/or with a reducing agent to obtain a water-soluble alkali metal salt of metal sulfide. The resulting product is then treated with an aqueous leach solution to selectively solubilize or leach out the alkali metal salt and the leaching solution containing the alkali metal salt is then separated from the insoluble concentrate residue.

In the case of molybdenum, vanadium, tin and antimony-containing alkali metal salts of the above-mentioned type, the leach solution containing said salt can be treated with a mineral acid to precipitate a water-insoluble acid metal sulfide used in the formation of a slurry that may be pressured oxidized in accordance with the process of the present invention. In the case of molybdenum, vanadium, and tin-containing salt solutions, sufficient acid should be added to the leach solution to lower the pH to less than 8.5 while with antimony-containing leach solutions, the pH should be less than 6.5. In the case of tungsten, the water-soluble alkali metal salt of tungsten sulfide does not precipitate as a water-insoluble tungsten sulfide. Other means must be used for obtaining the tungsten sulfide in water-insoluble form which are not economically desirable as far as the present overall process is concerned. Thus, as a practical matter while both slurries of water-insoluble acid metal sulfides and water soluble alkali metal salt of metal sulfide solutions may be conveniently obtained with molybdenum, vanadium, tin and antimony-containing compositions for pressure oxidation in accordance with the process of this invention, in the case of tungsten, only aqueous solutions of water-soluble alkali metal salts of tungsten sulfide are practically available for pressure oxidation.

Concentrates that may be used for obtaining water-soluble and water-insoluble metal sulfides to be pressure oxidized in accordance with our process include refractory metal molybdenum and vanadium containing ore concentrates which also contain impurities such as iron, copper, lead and zinc can be treated in accordance with the present invention.

The principle commercially processed and available molybdenum and vanadium ores, in addition to containing the refractory metal, contain iron, copper, lead or zinc impurities in the form of water insoluble compounds. The refractory metal sulfide compounds can be concentrated to the desired degree of concentration by conventional milling and flotation procedures.

The mineral molybdenite, MoS$_2$, is the principal commercial source of molybdenum. This mineral is normally found in ores in amounts of 0.2 to 1 percent by weight of the ore. The normal impurities associated with molybdenite are relatively large amounts of SiO$_2$, pyrite, FeS, and chalcopyrite, CuFeS$_2$, and lesser amounts of lead and zinc sulfides.

Another commercial source of molybdenum is the by-product from a copper-molybdenum ore concentrate processed to recover copper values.

A commercially available molybdenum ore concentrate containing about 58 percent by weight molybdenite, MoS$_2$, and a commercially available copper-molybdenum ore concentrate by-product having about 70 percent by weight molybdenum sulfide have the following compositions:

|        | MoS$_2$ ore Wt. % | Cu-MoS$_2$ ore by-product Wt. % |
|--------|-------------------|----------------------------------|
| MoS$_2$ | 58.1             | 70.0                             |
| Fe     | 5.3               | 6.0                              |
| Pb     | 0.85              | 0.20                             |
| Cu     | 0.46              | 8.0                              |
| Insol. | 20.5              | 6.0                              |

A principal source of vanadium sulfide is the mineral patronite, V$_2$S$_3$. Patronite ores contain about 1 percent vanadium. A by-product source of a vanadium-containing concentrate is known as ferrophosphorous which is obtained during elemental phosphorous production. The principal contaminants are iron, chromium and phosphorous.

A principal commercial source of tungsten is the mineral scheelite, CaWO$_4$. The commercial ores in addition to CaWO$_4$, contain relatively large amounts of silica and lesser amounts of pyrites, FeS$_2$, PbS, and CuS, and depending on the ore source, varying amounts of zinc and lead impurities.

Another source of tungsten is the mineral tungstenite WS$_2$.

The principal commercially processed and available tin ore concentrates contain tin oxide, iron, arsenic, lead and zinc impurities in the form of water insoluble compounds. The tin oxide can be concentrated to the desired degree of concentration by conventional milling and flotation procedures.

The mineral casserite, SnO$_2$, is the principal commercial source of tin. This mineral is normally found in ores in amounts of 1.5 to 5 percent by weight of the ore. The normal impurities associated with tin oxide are relatively large amounts of iron and lesser amounts of arsenic, lead, and zinc.

A principal commercial source of antimony is stibnite, $Sb_2S_3$. The commercial ores contain about 1.5 to 5.0 percent by weight of stibnite, relatively large amounts of silica and lesser amounts of pyrites, $FeS_2$, and depending on the ore source varying amounts of lead impurities.

In the examples which follow Example A relates to the preparation of an alkali metal salt of a metal (molybdenum) sulfide that is capable of being pressure oxidized in accordance with the present invention. Examples B through D pertain to the preparation of water-insoluble metal sulfides that may be pressure oxidized in accordance with our invention.

Examples 1 and 2 illustrate pressure oxidation of an aqueous slurry of a water-insoluble metal sulfide while 3 and 4 relate to pressure oxidation of an aqueous solution of an alkali metal salt of metal sulfide.

EXAMPLE A

Four thousand pounds of molybdenite, $MoS_2$, ore concentrate obtained from a commercial milling and flotation procedure is used as feed to the process. The molybdenite concentrate has the following principal constituents:

|            | % by Weight |
|------------|-------------|
| $MoS_2$    | 70.0        |
| CuS        | 6.0         |
| ZnS        | 2.5         |
| FeS        | 3.0         |
| PbS        | 1.5         |
| Acid Insol.| 15.0        |

The ore concentrate is admixed with 10,000 lbs. of anhydrous sodium sulfate and 2,680 lbs. of anhydrous of potassium sulfate and 2,400 lbs. of ground coke. This represents a molar ratio of ingredients of approximately 2.8 $Na_2SO_4$:0.7 $K_2SO_4$:8 C: 1 $MoS_2$. The admixture was fed to a furnace and heated to a temperature of 850° to 950° C. and maintained in this temperature range for about 30 minutes. At this temperature the mixture fuses and becomes molten. The liquid mass is cast and allowed to cool.

The cool mass weighing about 8,400 lbs., evidencing about 50 percent by weight loss of principally $CO_2$, was ground to a particle size of less than 10 mesh and fed to a leach tank. The ground reaction product is contacted with about a 3:1 ratio by weight of aqueous leach solution and agitated for about 1 hour at about 35° C. to extract substantially all of the water soluble alkali metal thio-molybdate compound.

The leach liquor is separated from the water insoluble residue. The residue is washed and the washed liquid is added to the leach liquor. The combined liquor has a pH of about 10 to 12 and contains about 60 g/l of the water soluble alkali metal thio-molybdate, measured as molybdenum, and substantially no PbS, CuS, ZnS or FeS since these compounds are not water soluble and do not form water soluble alkali metal thio-compounds.

The water insoluble residue contains substantially all of the PbS, CuS, ZnS and FeS, the unreacted carbon and the remaining gangue.

This residue can be dried and treated to recover copper, lead and/or zinc values.

EXAMPLE B

The aqueous leach liquor of Example A containing the water soluble alkali metal thio-molybdate can then be acidified by the addition thereto of a sufficient amount of sulfuric acid to lower the pH to about 2.5. As the pH is lowered, starting at a pH of about 6, a water insoluble acid molybdenum sulfide is formed and starts to preciptiate from solution. At pH 2.5 substantially all of molybdenum sulfide compound has precipitated. The precipitate is washed, dried and heated in an inert atmosphere to a temperature of 600° C. to drive off excess sulfur as elemental sulfur.

The remaining solid is analyzed and found to contain 99.5 percent by weight of $MoS_2$.

EXAMPLE C

An aqueous leach solution was obtained in the manner reported above in Example A and contained about 26.85 g/l of molybdenum in the form of water soluble sodium thio-molybdate and had an initial pH of 10 to 12 and was acidified by the addition thereto of 37 % HCl. A sufficient amount of HCl was added to reduce the pH to 1.0. During the addition of HCl a brown material precipitated from solution. The precipitate was separated from the leach solution, washed thoroughly and dried.

The dried precipitate was analyzed and found to be an acid molybdenum polysulfide having the following compositions:

|    | % by weight |
|----|-------------|
| Mo | 33.65       |
| S  | 64.48       |
| Na | 0.099       |

The amounts of excess sulfide in the precipitate varies with the amount of sulfide in solution at the point of precipitation.

The precipitate was heated in an inert atmosphere at a temperature below 600° C. and sulfur was distilled.

The temperature was then gradually increased over a period of 40 minutes from about 315° to 540° C. and no additional sulfur volatized. The residue appeared to be $MoS_2$ and when analyzed was found to contain 40 percent by wt. sulfur.

EXAMPLE D

An aqueous leach solution was obtained in the manner reported in the (Example A) and contained about 12.8 grams per liter of molybdenum in the form of sodium thio-molybdate and had an initial pH of 12.0 and was slowly acidified by the addition thereto of sulfuric acid to obtain a pH of 1.0.

The sulfuric acid was added to various hydrogen ion concentrations, during which the entire system was agitated. Samples of the slurry were extracted and filtered at the indicated hydrogen ion concentrations. The filtrate was analyzed for molybdenum concentration and the following results were obtained.

Effect of pH on Molybdenum Solubility in a Sodium Thiomolybdate-Sodium Sulfide Sodium Sulfate-Potassium Sulfate System

| Slurry pH | Mo Analysis of Filtrate g/l |
|-----------|------------------------------|
| 12.0      | 12.80                        |
| 4.0       | 1.63                         |
| 3.5       | 0.77                         |
| 3.0       | 0.52                         |
| 2.5       | 0.0012                       |
| 2.0       | 0.0009                       |
| 1.0       | 0.0005                       |

An analysis of the dried precipitate was also carried out and the results obtained are reported below.

| Element | %    |
|---------|------|
| Mo      | 33.7 |
| S       | 64.5 |
| Na      | 0.1  |

The ratio of molybdenum to sulfur indicates that an acid molybdenum polysulfide precipitate was obtained.

EXAMPLE 1

Example Illustrating Pressure Oxidation of Molybdenum Polysulfide Employing Compressed Air This experiment illustrates the slurry oxidation of water and molybdenum polysulfide with compressed air. Molybdenum polysulfide concentrate used for this experiment was the water-insoluble metal sulfide of Example D having the following analyses:

| Element | %    |
|---------|------|
| Mo      | 33.7 |
| S       | 64.5 |

Na        0.1

A slurry consisting of 1.6 liters at 5.8 percent solids was transferred to a 1-gallon agitated pressure reactor (Pfaudler), heated to 160° C. and then pressurized to 170 p.s.i.g. by introducing compressed air to the reactor. The oxidation reaction was obviously progressing, since the pressure increased to 400 p.s.i.g. after 1 hour of agitation, indicating an exothermic reaction. The pressure was released to 90 p.s.i.g. and immediately repressurized to 370 p.s.i.g. by introducing additional compressed air to the reactor to obtain oxygen from the air, and then allowed to react for approximately 1 hour. This pressure release and repressuring technique was employed for an additional three times to insure that sufficient oxygen was available for quadravalent molybdenum oxidation.

The entire system was allowed to cool to room temperature before the material in the reactor was discharged. The resulting slurry was filtered for solid and solution separation. The filter cake had a grayish texture. Analysis of the oven dried (480° F.) filter cake was as follows:

| Element | % |
|---|---|
| Mo | 39.7 |
| S | 36.2 (Carbon disulfide dissolution method) |
| S | 37.6 (Leco volatilization method) |

The filtrate pH was 0.8.

A sample of the dried filter cake was leached with an ammonium hydroxide solution (29 percent) at 60° C. for 15 minutes to determine the molybdenum solubility. The molybdenum solubility was 98.9 percent and the remaining residue weight calculated to 36 % S, indicating that a sulfur-molybdenum separation can be achieved by this technique.

The carbon disulfide dissolution data indicate the sulfur present in the reactor discharge is predominately elemental sulfur.

EXAMPLE 2

EXAMPLE ILLUSTRATING PRESSURE OXIDATION OF MOLYBDENUM POLYSULFIDE EMPLOYING OXYGEN

This experiment illustrates the batch slurry oxidation of water and molybdenum polyslufide with oxygen under various conditions of temperature, pressure, and time. A 2-liter Parr 4500 series pressure reactor was employed for this experimental work. The molybdenum polysylfide employed was the same as that used in Example 1 (i.e. metal sulfide of Example D).

Oxygen was introduced to the pressure reactor under pressure after the desired temperature had been attained. The oxidation reaction was allowed to proceed until a sample taken from the reactor was in the pH range of pH 0.9 to pH 0.8, after which the pressure reactor was allowed to cool and subsequently transferred to a filter where the solids were separated from the solution. The solution was analyzed for molybdenum content and the efficiency of molybdenum precipitation calculated accordingly.

The solids were dried, analyzed and mixed with an aqueous ammonia solution to dissolve the molybdenum values from the sulfur contaminants. The aqueous ammonia leach solution was filtered for a liquid-solids separation. A qualitative test of the solids indicated that the solids were substantially elemental sulfur.

The data obtained from the above experiment presented in the table below. It appears that the retention time at the conditions employed are less than 12 hours and the pH of the oxidized slurry must be less than pH 3.0. The optimum pressure and temperature relationships are dictated by the economics involved, e.g., less retention time will be required at the high pressures and temperatures.

| Experiment | A | B |
|---|---|---|
| Reaction Temperature — °C. | 150 | 220 |
| Total — psia | 114.6 | 466.6 |
| $O_2$ — psia | 102.6 | 189.9 |
| Reaction Time — hours | 12.5 | 2.0 |
| Reacted Slurry pH | 1.0 | 2.8 |
| Dried Precipitate Analysis — % Mo | 38.4 | 28.7 |
| Mo Precipitated — % | 91.6 | 60.4 |
| Mo Soluble in Aqueous Ammonia Solution — % | 97.4 | 99.0 |

EXAMPLE 3

EXAMPLE ILLUSTRATING PRESSURE OXIDATION OF SODIUM THIOMOLYBDATE - BATCH OPERATION

This example relates to batch oxidation of tetravalent molybdenum in solution as sodium thiomolybdate employing various conditions of temperatures, oxygen over pressure, time and mixing. A 2-liter Parr pressure reactor provided with external electrical temperature control and intake ports for air or oxygen, as well as a sampling port, was used for carrying out the pressure oxidation.

The pressure reactor was charged with 500 ml. of the aqueous solution of alkali metal salt of metal sulfide (sodium thiomolybdate) prepared in accordance with the method reported in Example A.

The conditions for all experiments were the same, except for reaction conditions, and are listed as follows:

| Temperature | 170°C. |
|---|---|
| Total Psia | 164.6 |
| Steam Psia | 114.8 |
| $O_2$ Psia | 49.8 |

Complete oxidation was measured by observing the color of the oxidized product, which was green, at a pH of pH 2.0 to 2.4. A blue color indicated incomplete oxidation.

| Experiment | A | B | C | D | E |
|---|---|---|---|---|---|
| Agitator tip speed ft/min | 376 | 1120 | 1120 | 376 | 1120 |
| Retention Time to pH: 2.0–2.4 — minutes | 42 | 32 | 15 | 110 | 45 |
| Mo Analysis of Sodium Thiomolybdate Solution g/l Mo | 20.0 | 153 | 20.0 | 20.1 | 41.6 | 40.0 |
| Percent elemental sulfur Recovered from oxidized Solution as related to Mo in system — ($S/Mo \times 100 =$) | 50.2% | 49.0% | 37.9% | 48.1% | 48.8% |
| Mo Content of Sulfur: % Mo | 0.74 | 0.36 | 0.11 | 0.13 | 0.19 |
| Sulfur Purity: % | 90.3 | 92.1 | 97.2 | 94.4 | 91.8 |

The test data reported above shows that oxidation of tetravalent molybdenum can be accomplished with the formation of elemental sulfur. The quantity of elemental sulfur formed varies with the conditions employed. The data also shows that the effect of mixing greatly enhances the time necessary for oxidation.

EXAMPLE 4

EXAMPLE ILLUSTRATING PILOT PLANT PRESSURE OXIDATION OF SODIUM THIOMOLYBDATE AND SOLVENT EXTRACTION PURIFICATION - (CONTINUOUS OPERATION)

This example illustrates continuous oxidation and solvent extraction purification of tetravalent molybdenum in solution as sodium thiomolybdate (alkali metal salt of metal sulfide). The system consisted of two 100-gallon stainless steel (SS316) pressure reactors for oxidation, one 100-gallon pressure reactor (SS316) for sulfur recovery by bottom discharge, and a "blow down" tank to allow release of pressure to atmospheric conditions without great loss of solution due to "flasing" of water vapor as the pressure is released.

A solution prepared in accordance with the method of Example A and containing 25 g/l Mo at a pH of 12.5 was continuously fed to the first oxidation reactor at a rate of 0.4 gpm. The pressure and temperature of the vessels throughout the 15-hour run were as follows:

|  | Psig | °F. |
|---|---|---|
| Oxidation Vessel No. 1 | 150 | 332–340 |
| Oxidation Vessel No. 2 | 150 | 320 |
| Sulfur Recovery Vessel | 32–60 | 270 |
| Blow Down Tank | 32–60 | 240–260 |

Samples taken from oxidation vessel commencing at 9 hours of operation were further oxidized with 3 percent hydrogen peroxide at 70° C. to obtain data as to complete oxidation. 100-ml. samples were used for this analysis. The hydrogen ion concentration (pH) of the solution sampled from oxidation vessel No. 2 ranged from pH 2.5 to pH 2.65. The solution was green in color, indicating efficient oxidation. Hydrogen peroxide data following also indicated that the solution was oxidized.

| Hours of Operation | lb $H_2O_2$ for Complete oxidation lb Mo |
|---|---|
| 9 | 0.0006 |
| 11 | 0.0018 |
| 12 | 0.0036 |
| 13 | 0.0024 |
| 14 | 0.0024 |
| 15 | 0.0024 |

Sulfur discharged from the sulfur recovery vessel appeared quite yellow in color, indicating high purity. The analysis of this sulfur sample was as follows:

99.8 % S
0.17 % Mo

The oxidized solution was clarified and fed to a solvent extraction circuit for purification and separation of sodium and potassium sulfate.

The solvent extraction circuit consisted of three extraction stages, two sulfate scrubbing stages and three stripping stages. A flow diagram of this system follows:

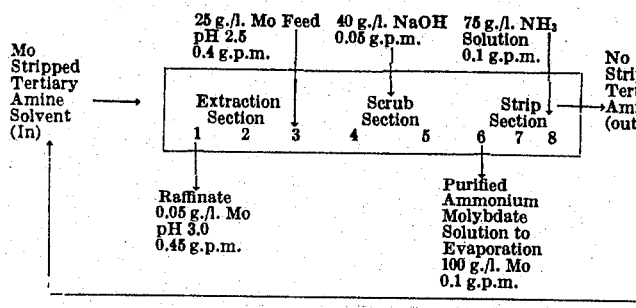

The extraction of molybdenum from the oxidized solution was greater than 99 percent. Product analysis of the evaporated ammonium molybdate solution after calcination at 450° C. for final sulfate removal was as follows:

| Constituent | % |
|---|---|
| $MoO_3$ | 99.0 |
| Pb | 0.02 |
| Fe | 0.037 |
| Ni | 0.004 |
| S | 0.03 |

What is claimed is:

1. A process for pressure oxidation of a metal-sulfide compound selected from the group consisting of molybdenum sulfide, vanadium sulfide, tungsten sulfide, tin sulfide, antimony sulfide and the alkali metal salts thereof which comprises subjecting a water solution or a water slurry of said metal sulfide compound to a temperature of from about 60° to 200° C. and a pressure of from about 50 to about 600 p.s.i.a. in the presence of oxygen or air in an amount sufficient to produce elemental sulfur to effect oxidation of the metal sulfide compound and produce elemental sulfur.

2. A process according to claim 1 wherein the metal sulfide compound is water-insoluble molybdenum sulfide.

3. A process according to claim 1 wherein the metal sulfide compound is a water-soluble alkali metal thio-molybdate.

4. A process according to claim 1 wherein the metal sulfide compound is a water-soluble alkali metal salt obtained by mixing an alkali metal sulfur compound with a metal concentrate at a molar ratio of at least 1.5 to 1, heating the mixture to a fusion temperature of 700° to 1,600° C. in a non-oxidizing atmosphere, contacting said product with an aqueous leach solution and selectivity solubilizing said alkali metal salt and separating said leach solution from an insoluble concentrate residue.

5. A process for the pressure oxidation of a metal sulfide selected from the group consisting of molybdenum sulfide, vanadium sulfide, tungsten sulfide, tin sulfide, antimony sulfide and the alkali metal salts thereof which consists essentially of subjecting a water solution or a water slurry of said metal sulfide to a gas selected from the group consisting of air and oxygen in an amount sufficient to produce elemental sulphur at a temperature of from about 60° to about 200° C. and a pressure of from about 50 to about 600 p.s.i.a. to effect the oxidation of the metal sulfide and produce elemental sulfur.

6. A process according to claim 5 wherein the metal sulfide is molybdenum sulfide or the alkali metal salts thereof.

7. A process according to claim 5 wherein the metal sulfide is vanadium sulfide or the alkali metal salts thereof.

8. A process according to claim 5 wherein the metal sulfide is tin sulfide or the alkali metal salts thereof.

9. A process according to claim 5 wherein the metal sulfide in antimony sulfide or the alkali metal salts thereof.

10. A process for the pressure oxidation of an alkali metal salt of a metal sulfide selected from the group consisting of molybdenum sulfide, vanadium sulfide, tungsten sulfide, tin sulfide and antimony sulfide, which comprises subjecting a water solution of said metal sulfide to a gas selected from the group consisting of air and oxygen at a temperature of from about 60° C. to about 200° C. and a pressure of from about 50 to about 600 p.s.i.a. to effect the oxidation of the metal sulfide and produce elemental sulfur.

* * * * *